US009858228B2

(12) United States Patent
Lasater

(10) Patent No.: US 9,858,228 B2
(45) Date of Patent: Jan. 2, 2018

(54) DYNAMIC ASSIGNMENT OF GROUPS OF RESOURCES IN A PERIPHERAL COMPONENT INTERCONNECT EXPRESS NETWORK

(71) Applicant: Futurewei Technologies, Inc., Plano, TX (US)

(72) Inventor: Robert Lasater, Menlo Park, CA (US)

(73) Assignee: Futurewei Technologies, Inc., Plano, TX (US)

( * ) Notice: Subject to any disclaimer, the term of this patent is extended or adjusted under 35 U.S.C. 154(b) by 263 days.

(21) Appl. No.: 14/822,672

(22) Filed: Aug. 10, 2015

(65) Prior Publication Data

US 2017/0046293 A1    Feb. 16, 2017

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01)

(58) Field of Classification Search
CPC .................. G06F 13/4022; G06F 13/4282
See application file for complete search history.

(56) References Cited

U.S. PATENT DOCUMENTS

| 7,379,994 | B2 * | 5/2008 | Collazo | H04L 41/0233 |
| | | | | 702/182 |
| 8,387,060 | B2 * | 2/2013 | Pirzada | G06F 9/45533 |
| | | | | 718/1 |
| 8,503,468 | B2 | 8/2013 | Akyol et al. | |
| 2008/0235430 | A1 * | 9/2008 | Boyd | G06F 13/4022 |
| | | | | 710/316 |
| 2014/0281106 | A1 * | 9/2014 | Saghi | G06F 3/0664 |
| | | | | 710/313 |

(Continued)

FOREIGN PATENT DOCUMENTS

| CN | 103049336 A | 4/2013 |
| CN | 103645954 A | 3/2014 |
| WO | WO-2017/024938 A1 | 2/2017 |

OTHER PUBLICATIONS

"International Application Serial No. PCT/CN2016/091775, International Search Report dated Oct. 19, 2016", 3 pgs.

(Continued)

*Primary Examiner* — Eric Oberly
(74) *Attorney, Agent, or Firm* — Schwegman Lundberg & Woessner, P.A.

(57) ABSTRACT

Systems and methods for analyzing a PCIe network using a graph-theory based analysis are disclosed. A management CPU is coupled to the root complex of the PCIe system and is operable to survey potential CPU-resource combinations in a PCIe system and assign a group of PCIe resources to a CPU. A first switch and a second switch are coupled to the root node, and a first CPU and a first group of PCIe resources are coupled to the first switch. The management CPU assigns a group of PCIe resources to a CPU based on the isolation of the first and second CPUs or a distance between the first and second CPUs and the groups of PCIe resources. According to some embodiments, for potential pairs of devices and NTB/CPUs, the distance between components is assessed, possible alternative paths are identified, and the isolation of the pair is determined.

18 Claims, 6 Drawing Sheets

(56) References Cited

U.S. PATENT DOCUMENTS

| | | |
|---|---|---|
| 2015/0026385 A1 | 1/2015 | Egi et al. |
| 2015/0262632 A1* | 9/2015 | Shelton .............. G06F 12/0246 |
| | | 711/103 |
| 2016/0134564 A1 | 5/2016 | Egi et al. |
| 2016/0266929 A1 | 9/2016 | Lu |

OTHER PUBLICATIONS

"International Application Serial No. PCT/CN2016/091775, Written Opinion dated Oct. 19, 2016", 3 pgs.

* cited by examiner

US 9,858,228 B2

DYNAMIC ASSIGNMENT OF GROUPS OF RESOURCES IN A PERIPHERAL COMPONENT INTERCONNECT EXPRESS NETWORK

FIELD

Embodiments of the present invention generally relate to the field of resource allocation in computer networks. More specifically, embodiments of the present invention relate to hardware and software methodologies for dynamically assigning groups of resources in a peripheral component interconnect express (PCIe) based network.

BACKGROUND

Various traditional communication and interconnection topologies are used in modern networks to communicate information (e.g., basic tree, fat-tree, CLOS, 2D or 3D torus, etc.). There are also various protocols used in implementing the topologies, such as Peripheral Component Interconnect (PCI) and PCI-Express (PCIe). Some of these protocols may be implemented in relatively simple communication environments or networks. PCIe is one of the most widely used interconnection mechanisms between central processing units (CPUs) and their immediate peripherals. Conventional PCIe environments or networks typically have only a single PCIe root complex. In these limited and confined environments, conventional PCIe approaches attempt to provide a high throughput, low-latency, packet based and switched interconnection technology.

SUMMARY

Embodiments of the present invention describe systems and methods for analyzing a PCIe network to identify cycles in the fabric using a graph-theory based analysis. For each potential device—NTB/CPU pair, a distance between components is assessed, possible alternative paths are identified, and an isolation of the pair is determined. Embodiments of the present invention offer greatly enhanced bandwidth and throughput in the link PCIe fabric by taking advantage of the point-to-point nature of the PCIe standard. Traffic moves between multiple pairs of resources (e.g., a CPU and a PCIe device) that are isolated from each other without interference, thus greatly increasing the overall maximum bandwidth over a traditional PCI fabric with one CPU.

According to one described embodiment, a method for dynamically assigning a group of network resources in a PCIe network is disclosed. The method includes identifying a first path and a second path between a CPU in the network and a group of network resources, calculating current potential traffic for the first and second paths based on current device assignments, monitoring current actual traffic over the first and second path, and assigning the group of network resources to the CPU using the first or second path based on at least one of the current potential traffic, the current actual traffic, and a total number of hops along the first and second paths.

According to another embodiment, a method for dynamically assigning a device to a CPU in a PCIe network is disclosed. The method includes receiving a resource request including a plurality of device types, calculating a first device type score for devices of a first device type associated with a first CPU, calculating a second device type score for devices of a second device type associated with the first CPU, calculating a first total CPU score by adding the first and second device type scores to a first CPU score associated with the first CPU, calculating a third device type score for devices of a third device type associated with a second CPU, calculating a fourth device type score for devices of a fourth device type associated with the second CPU, calculating a second total CPU score by adding the third and fourth device type scores to a second CPU score associated with the second CPU, and assigning the device to the first or second CPU based on the first and second total CPU scores, wherein the device is accessed using an NTB.

According to another embodiment, an apparatus for dynamically assigning groups of network resources in a PCIe network is disclosed. The apparatus includes a management CPU coupled to a root node of a PCIe network and operable to survey potential CPU-resource combinations in the network and assign a group of network resources to a CPU, a first switch and a second switch coupled to the root node, a first CPU and a first group of network resources coupled to the first switch, and a second CPU and a second group of network resources coupled to the second switch, where a first path from the first CPU to the first group of network resource comprises a first NTB and does not traverse the root node, a second path from the second CPU to the second group of network resource comprises a second NTB and does not traverse the root node, the first path and second paths are isolated from each other, and the management CPU is configured to assign the first or second group of network resources to the first or second CPU based on at least one of a degree of isolation of the first and second CPUs and the first and second groups of network resources and a distance between the first and second CPUs and the first and second group of network resources.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
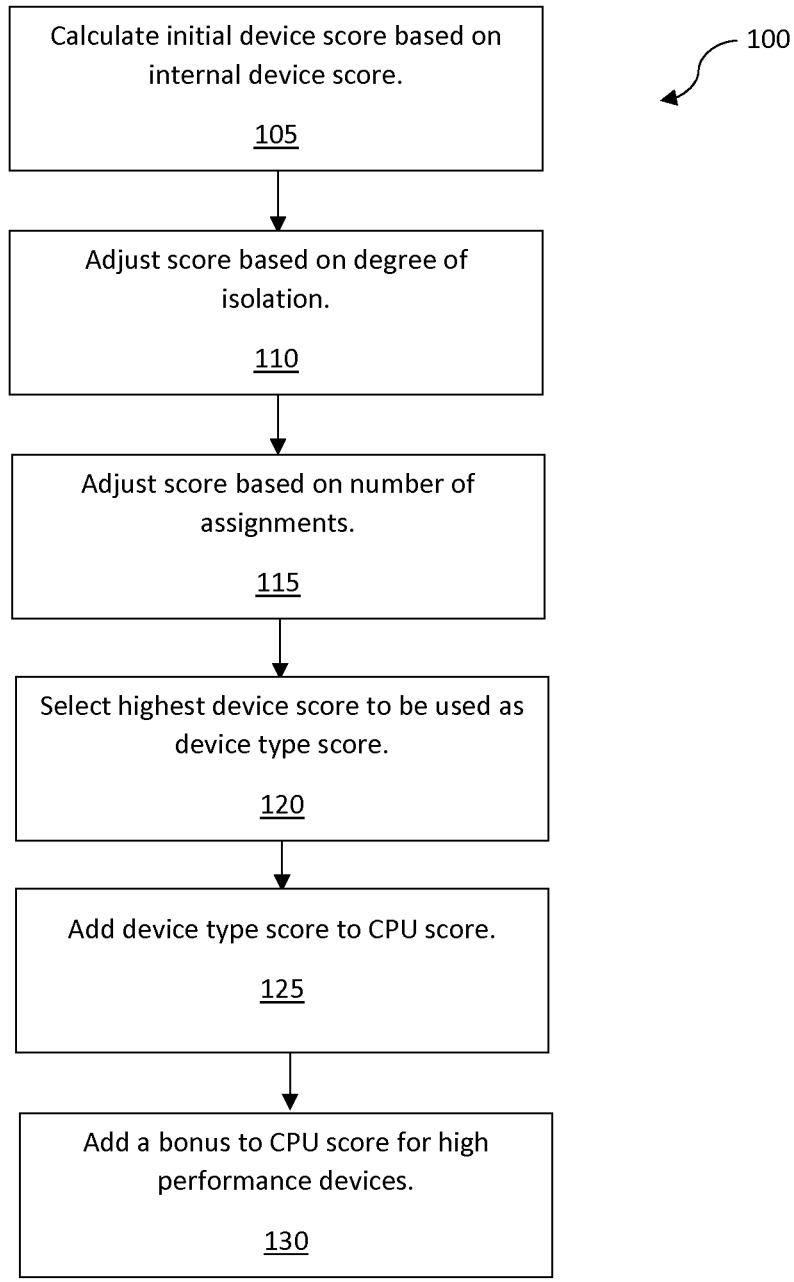
FIG. 1 is a flowchart depicting an exemplary sequence of computer implemented steps for assigning a CPU to a device according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Dynamic Assignment of Groups of Resources in a Peripheral Component Interconnect Express Network Embodiments of the present invention relate to systems and methods for analyzing a link PCIe fabric to identify cycles in the fabric using a graph-theory based analysis. For potential device-NTB/CPU pairs, a distance between components is assessed (e.g., a number of PCIe switches between the components), possible alternative paths are identified (where a shortcut NTB may be traversed), and a degree of isolation of the pair is determined. The degree of isolation and/or distance of the identified paths is used to assign a group of resources to the CPU.

Embodiments of the present invention offer greatly enhanced bandwidth and throughput in the link PCIe fabric by utilizing the point-to-point nature of the PCIe standard. Traffic moves between multiple pairs of resources that are isolated from each other without interference, thus greatly increasing the overall maximum bandwidth over a traditional PCI fabric with one CPU. Embodiments of the present invention permit a CPU to interact with groups of resources assigned to that CPU using a shortcut instead of the default path through the PCIe network. The use of shortcuts offers at least two advantages. First, the shortcut may well be a shorter path (e.g., fewer hops) than the default path. Second, selecting a shortcut may permit the traffic to avoid excessive traffic congestion in the network.

A previous invention entitled NON-TRANSPARENT BRIDGE METHOD AND APPARATUS FOR CONFIGURING HIGH-DIMENSIONAL PCI-EXPRESS NETWORKS (U.S. patent application Ser. No. 14/536,516) describes an apparatus for assigning IO resources to multiple CPUs, with each CPU in its own PCI fabric. The apparatus enables multiple CPUs to access IO devices located outside their local PCI fabric as if the devices were local.

Certain applications targeted to run on a PCIe microserver architecture, for example Big Data applications such as Hadoop or Spark, may require access to multiple resources, including CPU, FPGA or GPU acceleration, disk space, and network interfaces. These resources should be allocated and assigned as a group for maximum resource utilization. CPU capability is a required resources because a CPU must be available to run the application that is requesting the resources. A CPU and its required resources are assigned, and the selected remote CPU is told what other resources have been assigned to it. The remote CPU completes the process of gaining access to those other resources. According to some embodiments, this process is completed before the remote CPU begins executing the original application.

A PCIe network can be represented as a graph. By the PCIe standard, the graph is a tree and one node is designated as the root complex. Each edge in the graph has a direction, where the PCIe standard defines upstream as moving towards the root complex and downstream as moving away from the root complex. A microserver architecture often consists of a PCI fabric, a Link PCIe network with a single CPU (e.g., the Link or Management CPU), one or more input/out ("IO") devices and one or more non-transparent bridges (NTBs).

An NTB may be installed and configured to provide an alternate path (e.g., a shortcut) through a PCI fabric. These shortcuts effectively create cycles or loops in the fabric and thus can present two or more paths through the fabric between two components. Shortcuts are not bidirectional; each shortcut has an entrance and an exit. Each shortcut appears in the PCIe network as an endpoint device. When a given path between a network device and a group of resources becomes congested, the performance of the PCIe network devices may decrease substantially. A technique for assigning groups of resources to devices in the PCIe network using NTBs such that traffic congestion, both actual and potential, is avoided when satisfying a requested for resources is necessary to more efficiently utilize network resources.

Embodiments of the present invention accept a request for assignment of a group of resources and determines a combination of resources that most efficiently uses the PCIe network resources and avoid traffic congestion, both actual and potential, when satisfying the requested assignment of resources. Resource assignments are considered to be temporary; when the use of assigned resources is no longer necessary, the assignment is removed. It is possible for a path between a resource and a CPU to change, even while the resource and the CPU are interacting, with the goal of improved load distribution in the PCI network and avoiding excessive traffic congestion. The same monitoring techniques and criteria used for finding the best assignment of resources and paths between resources may also be used to identify CPU—resource pairs that benefit from reassignment using a different path.

A remote CPU having its own PCIe network, separate from the PCIe network having other resources, interacts with the other resources through an NTB. The NTB will effectively create a window or shortcut for the remote CPU to access the link PCIe network. For best results, assignment of a group of resources optimizes the use of the link PCIe network to enhance available bandwidth and avoid excessive traffic flow (e.g., congestion). The assignment may also make use of a shortcut if the shortcut will provide lower latency because the path is shorter, or because use of the shortcut will avoid current or potential traffic congestion. Assignment of such a group of resources is based on the current traffic conditions in the network to avoid, for example, routing an assignment through a part of the network which is currently experiencing heavy traffic loads when alternative paths with less congestion are available.

Finally, multiple instances of the resources the remote CPU will be using are expected to be present. For example, if an FPGA/GPU computation accelerator is present, there likely will be several instances of a same FPGA/GPU computation accelerator. Similarly, several disk drives are also expected to be available. In each case, when assigning a group of resources, there should be several choices for each type of resource. Assignment of these resources using shortcuts results in improved overall performance.

With regard to FIG. 1, a flowchart 100 comprising an exemplary sequence of computer implemented steps for assigning a CPU to a device in response to a resource request is depicted according to embodiments of the present invention. According to some embodiments of the present invention, an available CPU is allocated in response to a resource request by calculating a CPU score. For an unassigned CPU, a CPU score is calculated based on the device types contained in the request. For each requested device type, multiple device scores are calculated. For each available device of the device type, a device score is calculated based on an internal device score at step 105. A degree of isolation of the device and the CPU is determined and used to adjust the internal device score at step 110. A number of current assignments to the device is determined and used to adjust the internal device score at step 115. The highest device score is selected and used as the device type score at step 120. The device type score is added to the current CPU score at step 125. According to some embodiments, a bonus is added to the CPU score if the device type comprises a high performance device at step 130. After a score for each available CPU is computed, the CPU with the highest score is selected for assignment.

A. Increased Performance through Isolation

Figure 2:
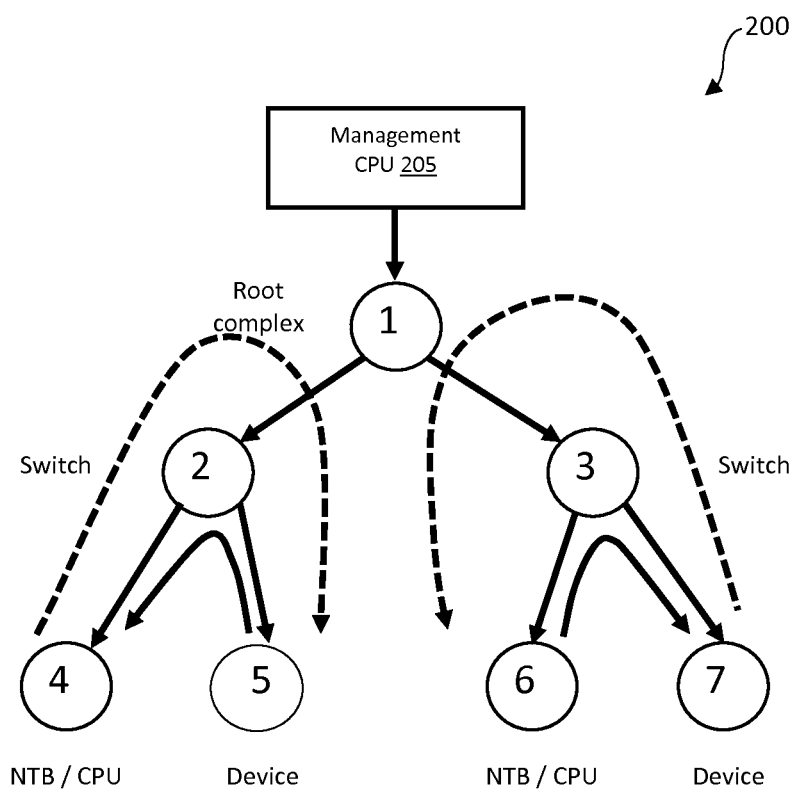
FIG. 2 is a diagram illustrating an exemplary PCIe network having a management CPU and multiple switches according to embodiments of the present invention.

With regard to FIG. 2, an exemplary PCIe network having a single management CPU 205 is depicted according to embodiments of the present invention. A PCIe network (e.g., network 200) is typically a point-to-point network. FIG. 2 illustrates this property. Traffic moving between a NTB/CPU at node 4 and a device at node 5 traverses the switch at node 2. Traffic does not traverse the root complex (node 1) or the right side of the PCI network (e.g., nodes 3, 6, and 7).

When two combinations of CPUs and devices are suitably isolated, data can be exchanged between the CPUs and the devices without interfering with each other. With regard to PCIe network 200 depicted in FIG. 2, traffic moving between the NTB/CPU at node 6 and the device at node 7 traverses the switch at node 3. As illustrated in FIG. 2, the devices are suitably isolated because the paths from the NTB/CPU to the respective device do not share a common node. Thus traffic may move at the full capacity of the PCI network between the NTB/CPU at node 4 and device at node 5, while at the same time traffic can also move at the full capacity of the PCI network between the NTB/CPU at node 6 and device at node 7. Because the NTB/CPU at node 4 and the device at node 5 are isolated from the NTB/CPU at node 6 and the device at node 7, the effective capacity of the PCI network has been doubled.

B. PCIe Network Survey

Embodiments of the present invention make use of shortcut paths constructed using NTBs in the link PCI fabric. Each shortcut adds a cycle to the fabric. For dynamic assignment of groups of resources, all cycles in the fabric are identified, and all nodes that belong to cycles are also identified. The process begins by identifying the entrance and exit of the shortcut NTBs. The fact that each shortcut creates a cycle in the graph follows immediately from the fact that in the original PCI network (without shortcuts), one path always exists between two nodes. The shortcut then creates a cycle by creating a new path between entrance and exit devices. Next, the group of nodes that forms the cycle are identified by working upstream from each side of a shortcut. The resulting paths are guaranteed to meet, at the latest at the root complex, and most often before reaching the root complex. Repeating this process for all shortcuts identifies a collection of nodes that all belong to at least one cycle in the PCIe network. These nodes may be considered 'cyclic nodes'. The edges that connect the cyclic nodes are considered 'cyclic edges' because they create cycles in the graph.

Figure 3:
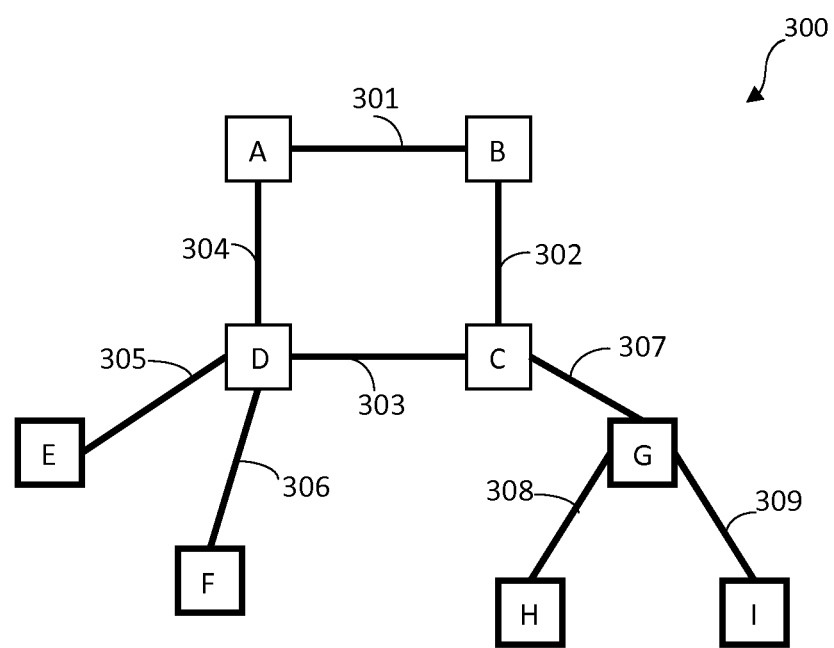
FIG. 3 is a block diagram illustrating an exemplary PCIe network according to embodiments of the present invention.

With regard to FIG. 3, an exemplary PCIe network 300 is represented as a block diagram according to embodiments of the present invention. One shortcut is present in this network (e.g., path 303), creating a cycle in the graph. A first cycle of nodes comprises nodes A, B, C, and D. Nodes A and B are connected using path 301, nodes B and C are connected using path 302, nodes C and D are connected using path 303, and nodes D and A are connected using path 304. Node D is also connected to node E using path 305 and node F using path 306. Node G is also connected to node H using path 308 and node I using path 309.

Figure 4:
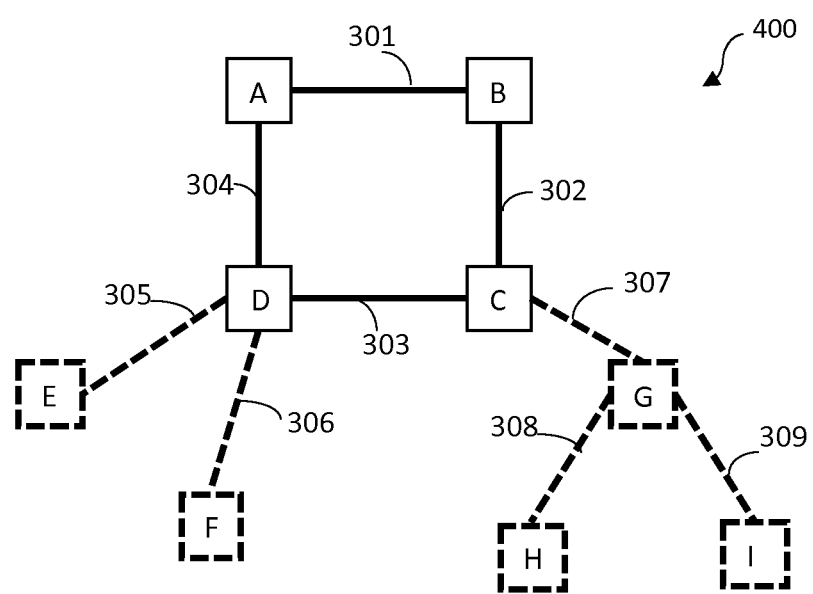
FIG. 4 is a block diagram illustrating an exemplary PCIe network with identified cyclic nodes and edges according to embodiments of the present invention.

With regard to FIG. 4, an exemplary PCIe network 400 with identified cyclic nodes (e.g., nodes A, B, C, and D) and cyclic edges (e.g., path 301, 302, 303, and 304) is depicted according to embodiments of the present invention. Cyclic nodes and cyclic edges are identified by the solid lines. Nodes and edges that are not cyclic are depicted by dashed lines. After the cyclic nodes are identified, the cycles are separated from the tree.

Figure 5:
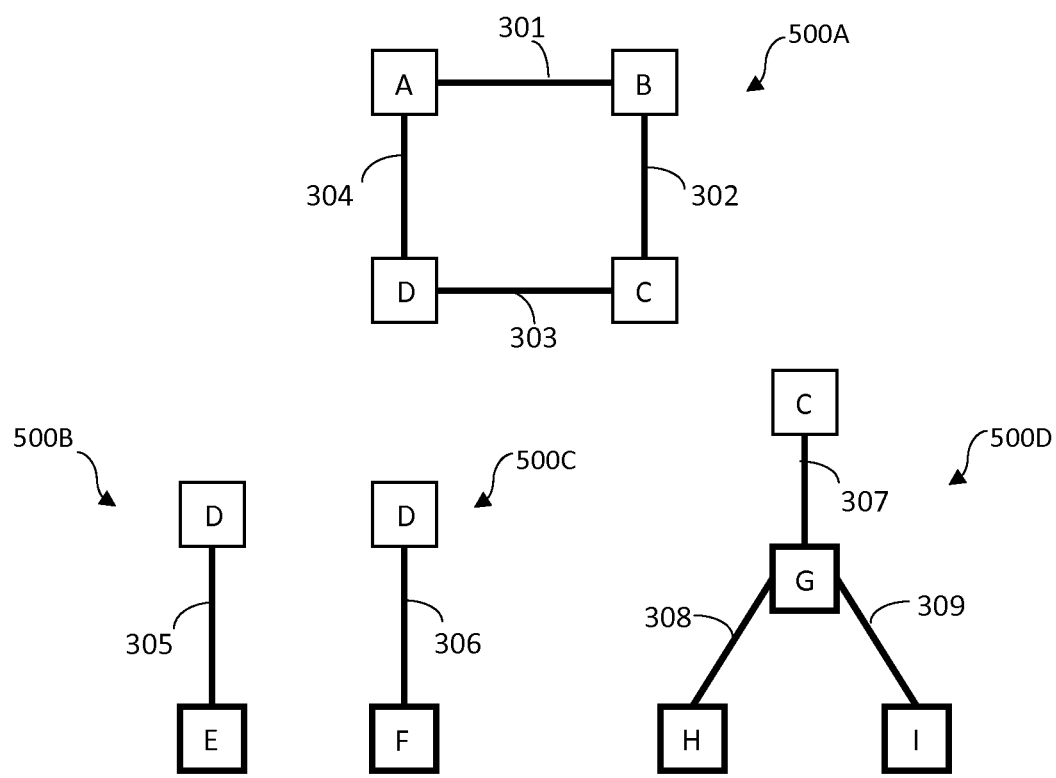
FIG. 5 is a block diagram illustrating an exemplary cyclic subgraph and exemplary tree subgraphs based on the PCIe network depicted in FIG. 4 according to embodiments of the present invention.

With regard to FIG. 5, the exemplary PCIe network 300 of FIG. 3 is divided into a cyclic subgraph 500A and tree subgraphs 500B, 500C, and 500D. Nodes C and D are cyclic nodes that are includes in the cyclic subgraph 500A and also included in tree subgraphs. Node D is depicted in tree subgraphs 500B and 500C, and node C is depicted in tree subgraph 500D. For each tree subgraph, there is only one path through the graph between any pair of nodes. Thus, the possibility of a choice of paths leading to the current best path does not exist for any node that is not part of a cycle.

Once the cyclic nodes and subgraphs have been identified, the devices are surveyed and the NTBs that are not part of a shortcut are identified. Each NTB that is not part of a shortcut is expected to have one or more attached CPUs. A cyclic node is assigned to each NTB and each device. When determining the current best path between a device and a CPU, the cyclic node closest to the device is where the device-end of a potential path starts, and the cyclic node closest to the CPU is where the CPU-end of a potential path starts. For example, with regard to the exemplary network graphs illustrated in FIGS. 3, 4 and 5, an NTB and one or more devices may be assigned to nodes C and D because these two cyclic nodes are where traffic from NTBs or devices would enter or leave the cyclic part of the network. This is the portion of the network where a choice of best paths is possible.

Each possible device-CPU/NTB combination is surveyed to establish how many possible paths exist between the CPU and the device, and also to establish how isolated each device-CPU combination would be from the remainder of the PCI network. As noted previously, device-NTB combinations that are isolated from the rest of the PCIe network typically offer the greatest overall performance.

According to some embodiments of the present invention, a routing configuration is generated for each type of device that may be assigned to a group of resources. The configuration comprises parameters such as device latency and the greatest amount of traffic that the device is able to exchange with a CPU (e.g., maximum bandwidth). Potential traffic is assessed by recording each CPU-device assignment and the expected maximum bandwidth for that device. Current actual traffic conditions are tracked by monitoring the traffic that passes through the switches in the PCIe network.

C. Monitoring

Embodiments of the present invention employ two forms of monitoring. First, traffic passing through each cyclic node is monitored. Second, as CPUs are assigned devices, each device-CPU assignment is recorded with the assigned path. By monitoring the traffic, the assignment process can avoid assigning paths that are currently more heavily loaded, and by monitoring previous assignments, the assignment process can avoid paths that may potentially become more heavily loaded during use.

Traffic passing through each cyclic node is considered to be 'actual traffic'. Actual traffic monitoring may be performed at any node. However, the traffic through nodes that are part of a cycle are most important for resource allocation purposes. According to some embodiments, only those nodes that offer a possible alternate path are monitored.

Future traffic is predicted based on prior device assignments. This estimated future traffic is referred to as "potential traffic". Each device has a maximum bandwidth/throughput. As groups are assigned, the CPU-device pairs are recorded with the assigned path and used by a dynamic assignment algorithm to avoid potential congestion, even if the CPU-device pair happen to currently be inactive.

D. Dynamic Assignment of Groups of Resources

Once the above analysis has completed, the system is ready to make assignments when a request for CPU capability and/or associated devices is received. Device types are analyzed based on latency and bandwidth. Where all other factors are equal, a low-latency device is assigned the shortest path possible, and the path between a CPU and a high-bandwidth device should is as isolated as possible. The assignment process surveys CPUs for availability, where each previous assignment was recorded and is thus known to the assignment process. Available CPUs are then surveyed to determine which available CPUs have the best access to the other required resources. Criteria used to make this assessment include the relative isolation of the device-CPU pair and the availability of less congested paths.

Figure 6:
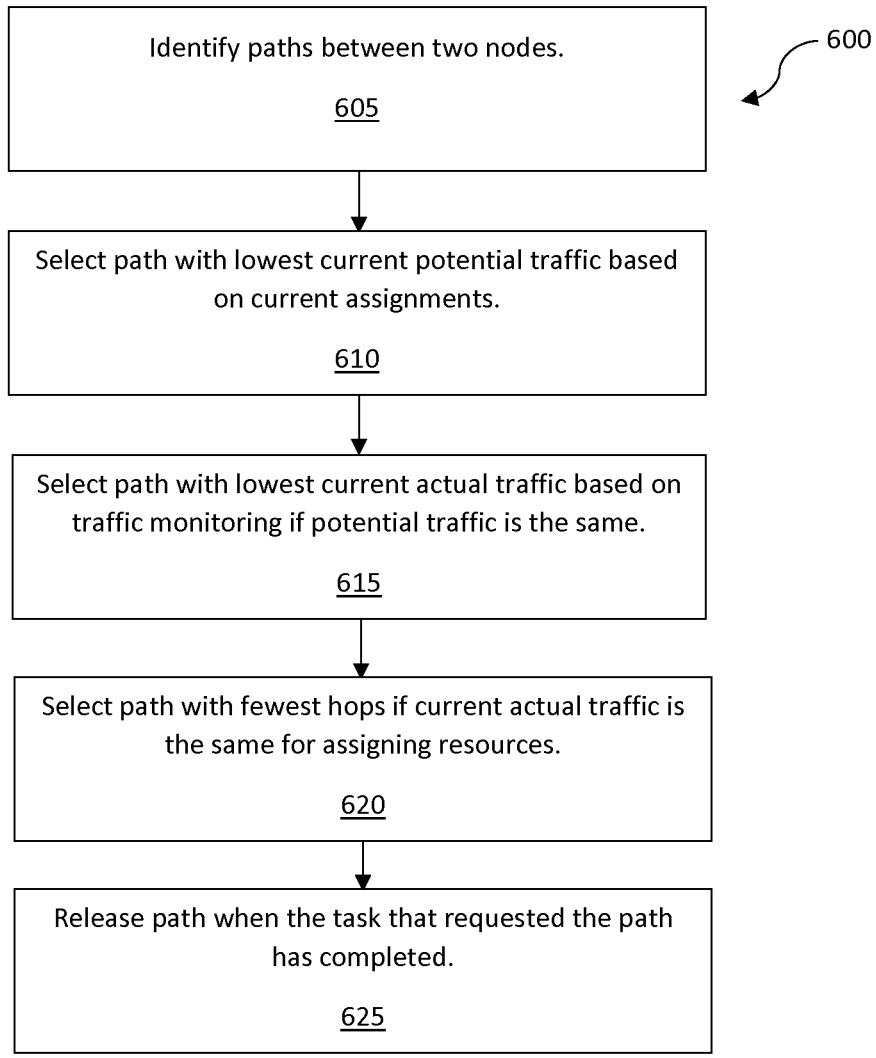
FIG. 6 is a flowchart depicting a sequence of computer implemented steps for dynamic assignment of groups of resources in a PCIe network according to embodiments of the present invention.

With regard to FIG. 6, a flowchart 600 illustrating an exemplary sequence of computer implemented steps for assigning resources in a PCIe network is depicted according to embodiments of the present invention. A resource assignment algorithm for choosing a path between nodes starts with a CPU and a device and assumes there is more than one path between the two nodes. At step 605, the paths between the nodes is identified. For each path, the current potential traffic is determined based on current assignments at step 610. If no best path (e.g., a path with significantly less potential traffic) is found, the current actual traffic is determined from traffic monitoring at step 615. If still no best path is found (e.g., all paths are equally congested), the path with the fewest hops is selected at step 620. According to some embodiments, when changing a path for a previous assignment, a set amount of time passes before the path can be changed.

When the task that requested the assignment of the group of resources completes, the record of those assignments is removed from the system at step 625. With respect to monitoring, this means the path or paths assigned to the group of resources are updated to reflect that the potential bandwidth usage resulting from those assignments is no longer present.

Embodiments of the present invention are thus described. While the present invention has been described in particular embodiments, it should be appreciated that the present invention should not be construed as limited by such embodiments, but rather construed according to the following claims.

What is claimed is:

1. An apparatus for dynamically assigning groups of resources in a PCIe system, comprising:
a management CPU coupled to a root complex of the PCIe system and operable to survey potential CPU-resource combinations in the PCIe system and assign a group of PCIe resources to a CPU;
a first switch and a second switch coupled to the root complex;
a first CPU and a first group of PCIe resources coupled to the first switch; and
a second CPU and a second group of PCIe resources coupled to the second switch, wherein a first path from the first CPU to the first group of PCIe resource comprises a first non-transparent bridge (NTB) and does not traverse the root complex, a second path from the second CPU to the second group of PCIe resource comprises a second NTB and does not traverse the root complex, the first path and second path are isolated from each other, and the management CPU is configured to assign the first or second group of PCIe resources to the first or second CPU based on at least one of a degree of isolation of the first and second CPUs and the first and second groups of PCIe resources and a distance between the first and second CPUs and the first and second groups of PCIe resources;
wherein the management CPU is further configured to:
create a first shortcut between the first CPU and the first group of PCIe resources using the first NTB;
create a second shortcut between the second CPU and the second group of PCIe resources using the second NTB;
calculate current potential traffic of the first and second paths based on current device assignments;

assign a third group of PCIe resources using the first or second path based on the current potential traffic when the current potential traffic of the first path is significantly different than the current potential traffic of the second path;
monitor current actual traffic over the first and second paths;
assign the third group of PCIe resources using the first or second path based on the current actual traffic when the current potential traffic of the first path is not different than the current potential traffic of the second path; and
assign the third group of PCIe resources using the first or second path based on a total number of hops along the first and second paths when the current actual traffic of the first path is not different than the current actual traffic of the second path.

2. A method for dynamically assigning a group of PCIe resources to a CPU in a PCIe system comprising:
identifying a first path and a second path between the CPU and the group of PCIe resources;
calculating potential traffic for the first and second paths based on device assignments;
monitoring actual traffic over the first and second paths; and
assigning the group of PCIe resources to the CPU using the first or second path based on:
the potential traffic when a first difference between the potential traffic of the first path and the potential traffic of the second path is greater than a first traffic threshold;
the actual traffic when a second difference between the potential traffic of the first path and the potential traffic of the second path is less than a second traffic threshold; and
the total number of hops along the first and second paths when a third difference between the actual traffic of the first path and the actual traffic of the second path is less than a third traffic threshold and a fourth difference between the potential traffic of the first path and the potential traffic of the second path is less than a fourth traffic threshold.

3. The method of claim 2, wherein identifying a first path and a second path comprises:
creating a shortcut in the PCIe using an NTB; and
traversing a path from a first end of the NTB to a second end of the NTB to identify a cycle comprising the shortcut, wherein the cycle further comprises at least one of the first path and the second path.

4. The method of claim 2, wherein calculating potential traffic is based on a maximum bandwidth of a device of the group of PCIe resources.

5. The method of claim 2, wherein the CPU comprises an NTB.

6. The method of claim 2, wherein the monitoring actual traffic is performed by a management CPU.

7. The method of claim 2, further comprising tracking PCIe resource assignments related to the CPU and releasing a first PCIe resource assignment when the first PCIe resource assignment is no longer used by the CPU.

8. The method of claim 7, further comprising reassigning the group of PCIe resources to a second CPU based on a change in a traffic condition, wherein the reassigning improves load balance.

9. A method for dynamically assigning a device to a CPU in a PCIe system comprising:
receiving a resource request comprising a plurality of device types;
calculating a first device type score for devices of a first device type associated with a first CPU;
calculating a second device type score for devices of a second device type associated with the first CPU;
calculating a first total CPU score by adding the first and second device type scores to a first CPU score associated with the first CPU;
calculating a third device type score for devices of a third device type associated with a second CPU;
calculating a fourth device type score for devices of a fourth device type associated with the second CPU;
calculating a second total CPU score by adding the third and fourth device type scores to a second CPU score associated with the second CPU; and
assigning the device to the first or second CPU based on the first and second total CPU scores, wherein the device is accessed using an NTB.

10. The method of claim 9, further comprising calculating a plurality of device scores for a plurality of devices of the first, second, third, and fourth device types, and using the highest device score as the device type score for the respective device type.

11. The method of claim 10, wherein the resource request further comprises a CPU capability requirement, and CPUs that do not satisfy the CPU capability requirement are excluded.

12. The method of claim 11, wherein the CPU capability requirement comprises a number of CPU cores.

13. The method of claim 12, wherein calculating the device scores is based on at least one of available bandwidth and available resources.

14. The method of claim 13, wherein calculating the device scores is further based on a number of current assignments of an associated device.

15. The method of claim 14, wherein calculating the device scores is further based on a degree of isolation between the associated device and the CPU.

16. The method of claim 15, wherein calculating the device scores is further based on a number of hops between the associated device and the CPU.

17. The method of claim 16, further comprising adding a bonus to the first, second, third, or fourth device score if the associated device is a high performance device.

18. The method of claim 17, wherein the plurality of device scores are further based on an amount of current traffic associated with the devices.

* * * * *

UNITED STATES PATENT AND TRADEMARK OFFICE
CERTIFICATE OF CORRECTION

PATENT NO. : 9,858,228 B2
APPLICATION NO. : 14/822672
DATED : January 2, 2018
INVENTOR(S) : Robert Lasater Page 1 of 1

It is certified that error appears in the above-identified patent and that said Letters Patent is hereby corrected as shown below:

In the Specification

In Column 4, Line 17, delete "10" and insert --IO-- therefor

In Column 4, Line 19, delete "10" and insert --IO-- therefor

Signed and Sealed this
Twenty-eighth Day of May, 2019

Andrei Iancu
*Director of the United States Patent and Trademark Office*